(12) United States Patent
Silver et al.

(10) Patent No.: US 7,616,648 B2
(45) Date of Patent: Nov. 10, 2009

(54) INTERNET AUDIO GATEWAY

(75) Inventors: Andrew Silver, Dallas, TX (US);
Mahbubul Alam, Dallas, TX (US);
Arvind Betrabet, Murphy, TX (US);
Seshagiri R. Madhavapeddy,
Richardson, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 733 days.

(21) Appl. No.: 10/510,436

(22) PCT Filed: Apr. 10, 2003

(86) PCT No.: PCT/US03/11004
§ 371 (c)(1),
(2), (4) Date: Oct. 6, 2004

(87) PCT Pub. No.: WO03/088603
PCT Pub. Date: Oct. 23, 2003

(65) Prior Publication Data
US 2005/0232282 A1    Oct. 20, 2005

Related U.S. Application Data

(60) Provisional application No. 60/371,468, filed on Apr. 10, 2002.

(51) Int. Cl.
H04L 12/28 (2006.01)
H04L 12/56 (2006.01)
H04J 3/12 (2006.01)
(52) U.S. Cl. ...................... 370/401; 370/522
(58) Field of Classification Search .............. 370/401, 370/522
See application file for complete search history.

(56) References Cited

U.S. PATENT DOCUMENTS

| | | | |
|---|---|---|---|
| 6,167,043 A * | 12/2000 | Frantz .................... 370/356 |
| 6,198,738 B1 * | 3/2001 | Chang et al. .............. 370/352 |
| 6,259,691 B1 * | 7/2001 | Naudus .................... 370/352 |
| 6,282,192 B1 | 8/2001 | Murphy et al. |
| 6,335,927 B1 * | 1/2002 | Elliott et al. .............. 370/352 |
| 6,944,150 B1 * | 9/2005 | McConnell et al. ......... 370/352 |
| 2002/0006124 A1 * | 1/2002 | Jimenez et al. ............ 370/352 |
| 2002/0038376 A1 * | 3/2002 | Halliday .................. 709/231 |
| 2002/0068554 A1 * | 6/2002 | Dusse ..................... 455/419 |
| 2003/0032409 A1 * | 2/2003 | Hutcheson et al. ......... 455/414 |
| 2003/0074443 A1 * | 4/2003 | Melaku et al. ............. 709/224 |
| 2003/0103607 A1 * | 6/2003 | Feakes .................. 379/88.17 |
| 2003/0134622 A1 * | 7/2003 | Hsu et al. ................. 455/414 |
| 2003/0134651 A1 * | 7/2003 | Hsu ....................... 455/509 |
| 2003/0145064 A1 * | 7/2003 | Hsu et al. ................. 709/219 |

(Continued)

FOREIGN PATENT DOCUMENTS

JP       2001218273 A  *  8/2001

(Continued)

*Primary Examiner*—Kevin C Harper
(74) *Attorney, Agent, or Firm*—Garlick, Harrison & Markison, LLP

(57) ABSTRACT

A method and system is disclosed for an internet audio gateway for delivering data based audio content to devices that are incapable of receiving and processing such content in the data form or where the device is capable of receiving and processing such data but the network is not capable of delivering such content.

20 Claims, 14 Drawing Sheets

U.S. PATENT DOCUMENTS

2005/0232282 A1 * 10/2005 Silver et al. .................. 370/401
2007/0129074 A1 * 6/2007 Bloebaum et al. ........... 455/434

FOREIGN PATENT DOCUMENTS

| | | | | |
|---|---|---|---|---|
| JP | 2001345804 A | * | 12/2001 | |
| JP | 2002033847 A | * | 1/2002 | |
| KR | 2002003630 A | * | 1/2002 | |
| KR | 2002072434 A | * | 9/2002 | |

* cited by examiner

INTERNET AUDIO GATEWAY

BACKGROUND

The field of the invention relates to wireless communications networks and specifically to a system that allows streaming of Internet based audio content to wireless users.

There is no current solution of the problem in such a form where either the device or the network is capable of delivering data based audio content in an efficient manner.

SUMMARY

The invention discloses a methodology of selecting static and dynamic audio contents derived from, for example, the internet, intranet or other sources in the data mode via, for example, a data browser, and delivery of the said content in the form of data to wireless devices via the traditional wireless voice path (not on the data path). The invention for a wireless environment as well as a wired environment.

Examples of the content include streaming internet audio contents such as: Internet radio stations; serialized audio books; audio versions of newspapers and magazines; custom business audio content; seminars; talk shows; transcoded content, for example, from video to audio; and an audio feed from television shows.

Some other examples include information messages such as: mobile telephone ring tones; weather reports; sports reports; business reports; horoscopes; soap opera reviews; movie reviews and schedules; and traffic reports.

Some other examples include music audio files such as: MP3 audio Files and CD audio files. Other types of audio files, such as, .wav, .au, real audio, windows media, mpeg, etc. are also envisioned.

The invention solves the problem of delivering data based audio content to devices that are incapable of receiving and processing such content in the data form or where the device is capable of receiving and processing such data but the network is not capable of delivering such content.

One advantage is that there is no impact on the existing network infrastructure or device. Therefore, in accordance with the previous summary, objects, features and advantages of the present disclosure will become apparent to one skilled in the art from the subsequent description and the appended claims taken in conjunction with the accompanying drawings.

DETAILED DESCRIPTION OF THE PREFERRED EMBODIMENTS

The present disclosure can be described by the embodiments given below. It is understood, however, that the embodiments below are not necessarily limitations to the present disclosure, but are used to describe a typical implementation of the invention.

Figure 1:
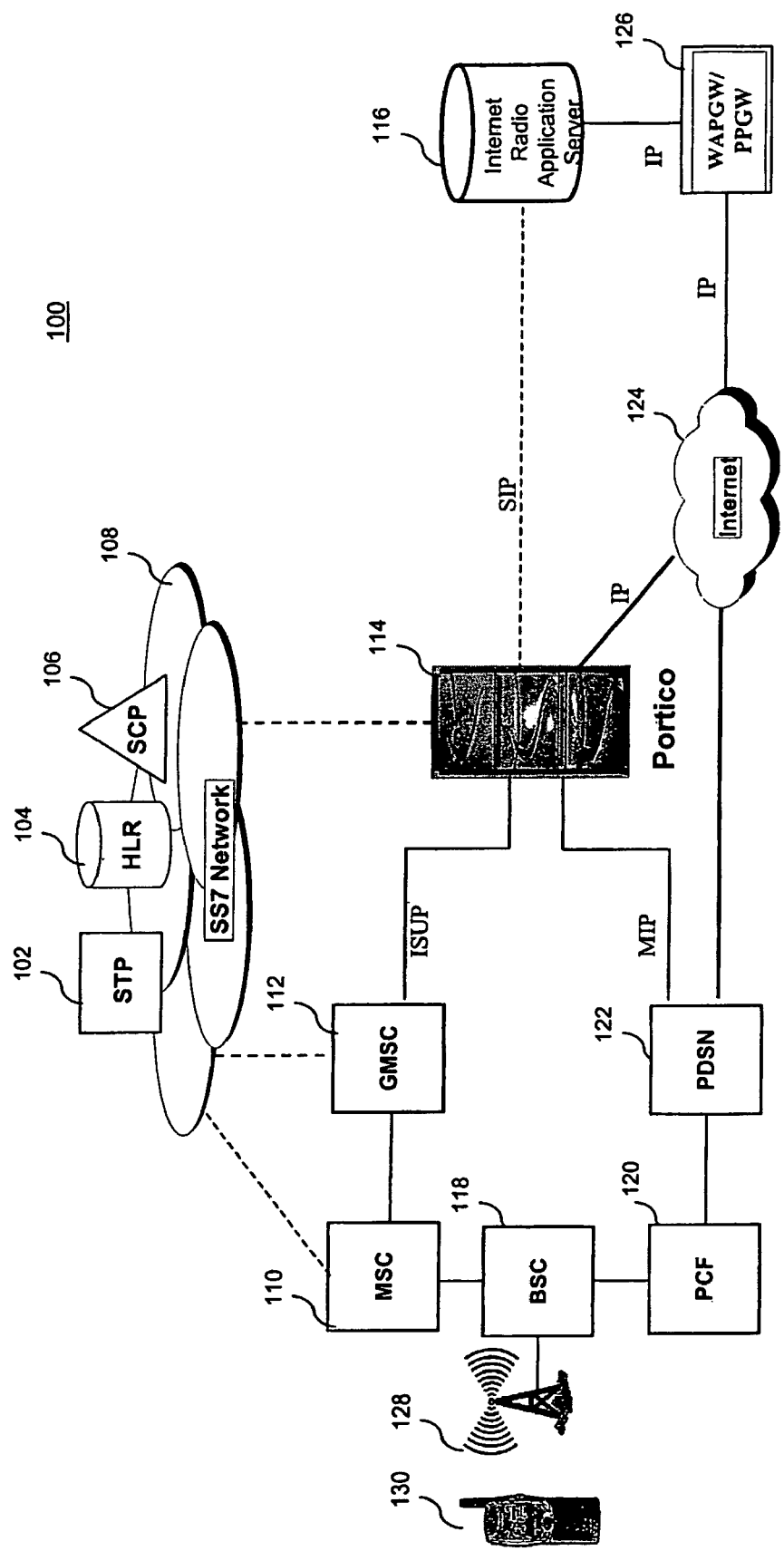
FIG. 1 is a diagram of the network architecture for the present invention.

Now referring to FIG. 1, a network architecture 100 for an internet radio service is shown. Within an 557 network 108, an STP 102, an HLR 104 and SCP 106 is shown. The 557 network 108 is shown connected to a MSC 110, a GMSC 112 and an Internet Audio Gateway 114. Connected to the Internet Audio Gateway 114, is an Internet Radio Application Server 116 through a SIP connection and the Internet 124. In addition, the Internet Radio Application Server 116 is connected to a Wireless Application Protocol (WAP) Gateway/WAP Push 126.

Moreover, a Packet Data Service Node (PDSN) 122 is connected to the Internet Audio Gateway 114 as well as the Internet 124 and a PCF 120. In turn, the PCF 120 is connected to a Base Station Controller 118 which also connects to the Mobile Switching Center (MSC) 110 and Base Station System (BSS) 128. The BSS 128 in turn allows wireless users (mobile stations—MS) 130 to connect to the network 100. In this embodiment, the network allows users to select a radio station from a list and listen to the radio station during the same session through streaming audio.

Figure 2:
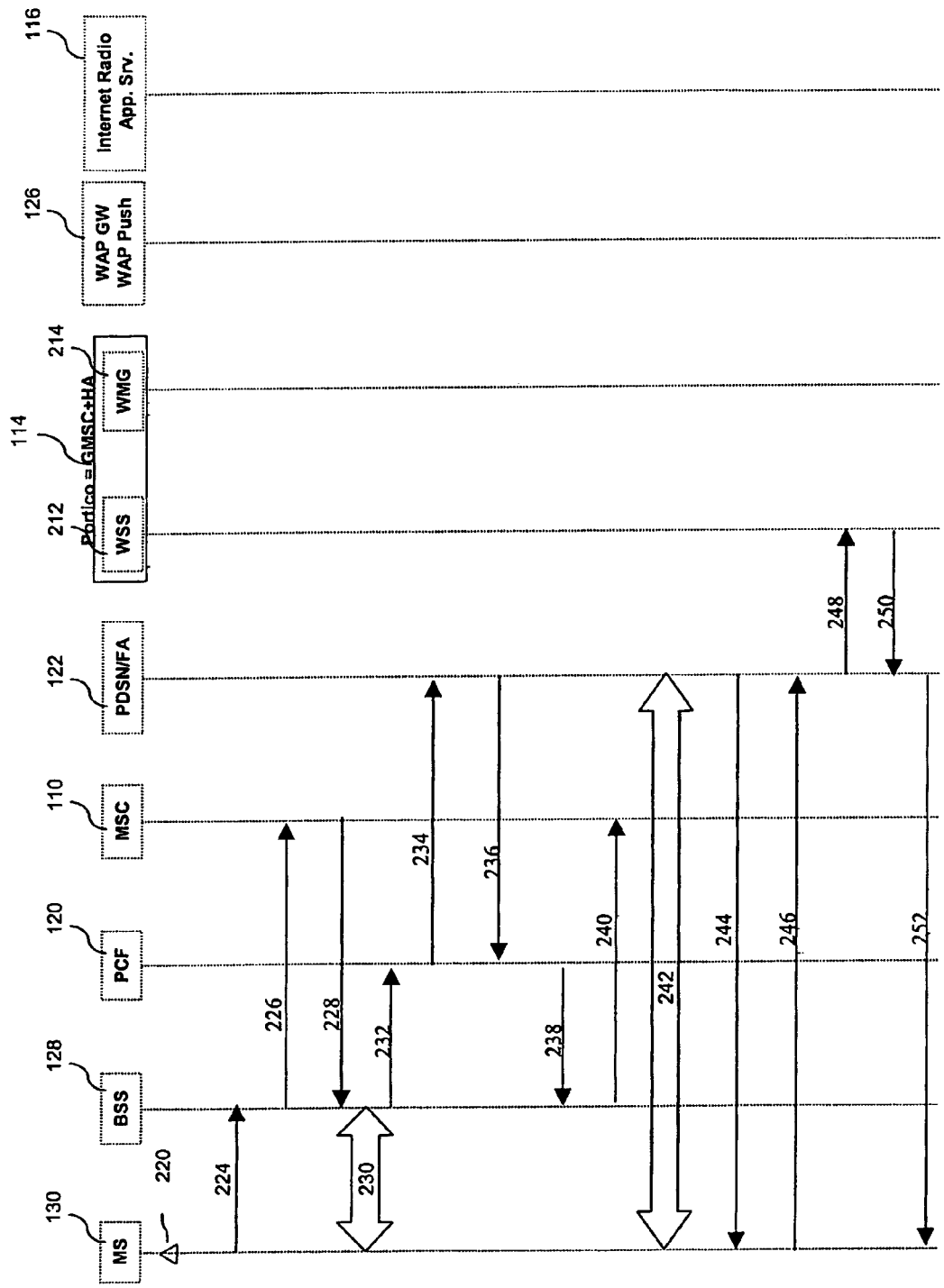
FIGS. 2-8 are CDMA call flow diagrams for a first embodiment of the invention.
Figure 3:
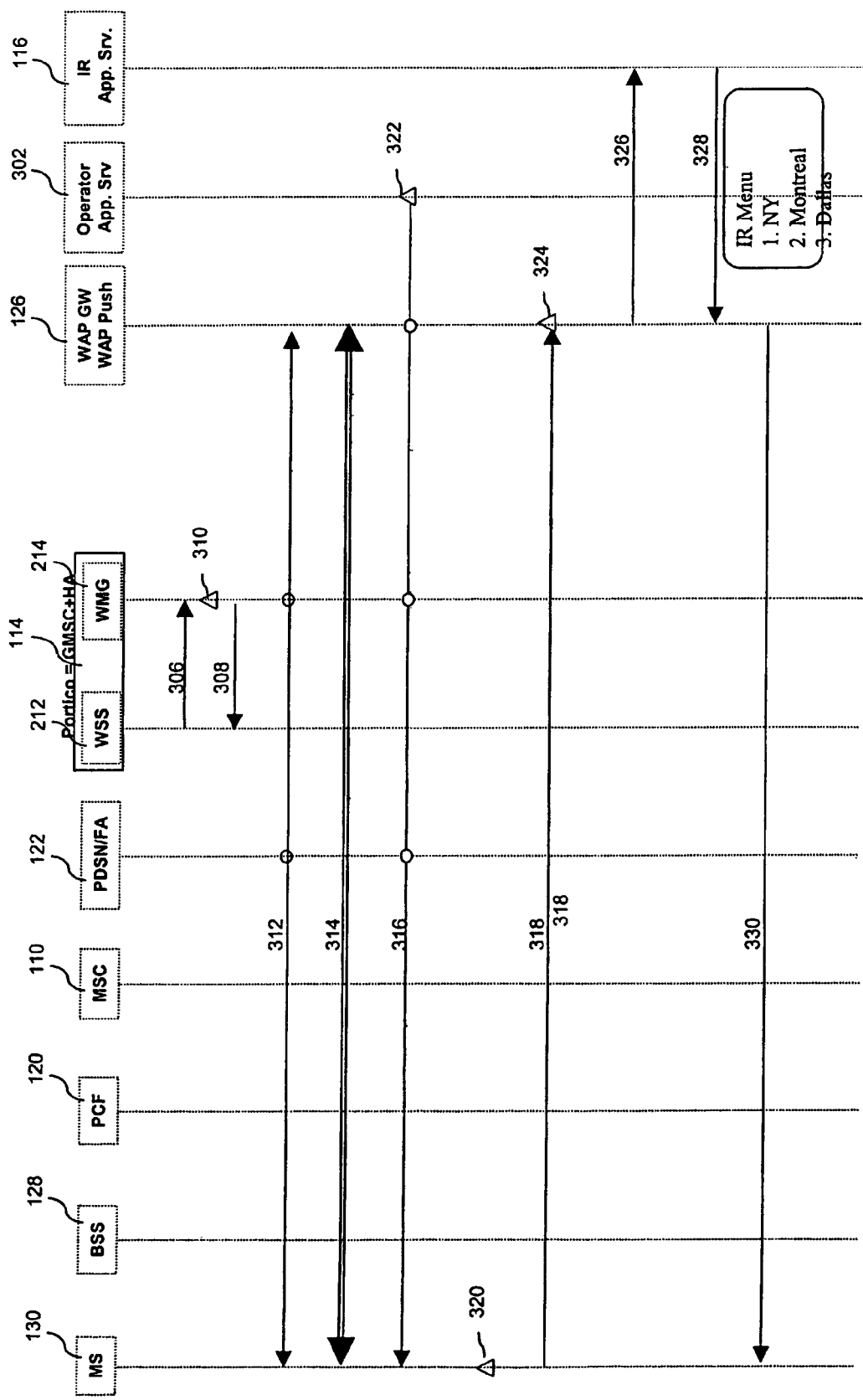

Now turning to FIGS. 2-8, a Code Division Multiplexing Access (CDMA) call flow for the Internet Audio Gateway will be described. Particularly, FIG. 2, shows the MS 130 initiating a packet session and selecting a service in reference to stage 220. Specifically, the MS 130 sends an origination message 224 to BSS 128. The BSS 128 in turn sends a BSSM:CL3 Info:CM_Service Request[Service Option=Packet Data Service] message 226 to MSC 110. MSC 110 in turn returns an Assignment_request message 228 to the BSS 128. TCH Setup 230 then occurs between the BSS 128 and the MS 130. The BSS 128 then sends an A9-Setup-A8 message 232 to the PCF 120. An A11-Registration Request message 234 is then sent from the PCF 120 to the PDSN/FA 122. An A11-Registration Reply message 236 is then sent from the PDSN/FA 122 to the PCF 120. The PCF 120 then sends an A9-Connect-A8 message 238 to the BSS 128. The BSS 128 then sends an Assignment_complete message 240 to the MSC 110. A Point to Point (PPP) connection is then established between the MS 130 and the PDSN/FA 122.

In addition, a MIP Agent Advertisement 244 is then sent from the PDSN/FA 122 to the MS 130. In turn, the MS 130 then sends a MIP Registration Request 246 to the PDSN/FA 122. The PDSN/FA 122 then sends an MIP Registration Request 248 to the Wireless Soft Switch (WSS) 212 portion of the Internet Audio Gateway 114. The WSS 212 then sends a MIP Registration Reply 250 to the PDSN/FA 122. The PDSN/FA 122 then sends the MIP Registration Reply 252 to the MS 130.

Now turning to FIG. 2, the WSS 212 sends a MEGACO: ADD message 306 to the Wireless Media Gateway (WMG) 214 portion of the Internet Audio Gateway 114. The WMG 214 then establishes termination points with the IP network at stage 310 and then sends a MEGACO:Success message 308 to the WSS 212. A Wireless Access Protocol (WAP) Browser Session 312 is then established between the MS 130 and the WAP Gateway (GW) 126. A WAP Session 314 is also then established between the MS 130 and the WAP GW 126. A home page is then downloaded from an Operator Application Server 302 at stage 322 and then sent 316 to the MS 130. The user then selects "Internet Radio Services" from the operator home page at stage 320. The selection is then sent 318 from the MS 130 to the WAP GW 126. Stage 324 indicates that the selection is hyper linked to the Internet Radio application server. A message 326 is then sent from the WAP GW 126 to the Internet Radio (IR) Application Server 116 indicating that the user selected Internet Radio service. IR content 328 is then sent from the IR Application Server 116 to the WAP GW 126. Encoded content 330 is then sent from the WAP GW 126 to the MS 130.

Figure 4:
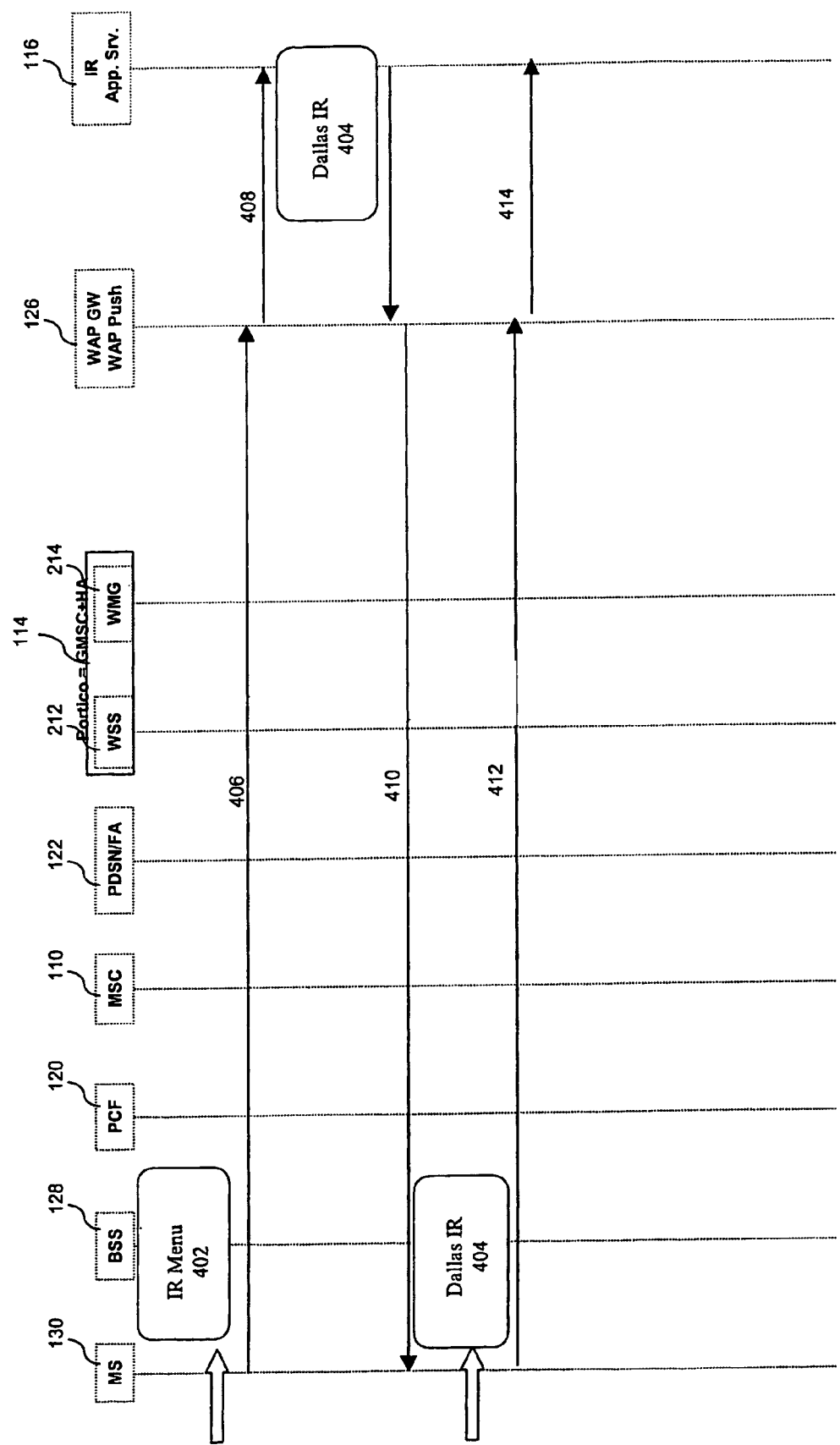

Now turning to FIG. 4, an IR menu 402 is presented to the user with a choice of NY, Montreal and Dallas cities as choices for the Internet Radio service. In this embodiment, the user chooses Dallas and then the MS 130 encoded the content in a message 406 that is sent to the WAP GW 126. The WAP GW 126 then sends Dallas selection 408 to the IR Application Server 116. The IR Application Server then sends the WAP GW 126 a Dallas IR menu 404 with local stations for the Dallas area as choices for the user. The WAP GW 126 then sends 410 the menu to the MS 130. The user then chooses from the local stations and sends 412 the selections back to the WAP GW 126, which, in turn, sends 414 the selection to the IR Application Server 116.

Figure 5:
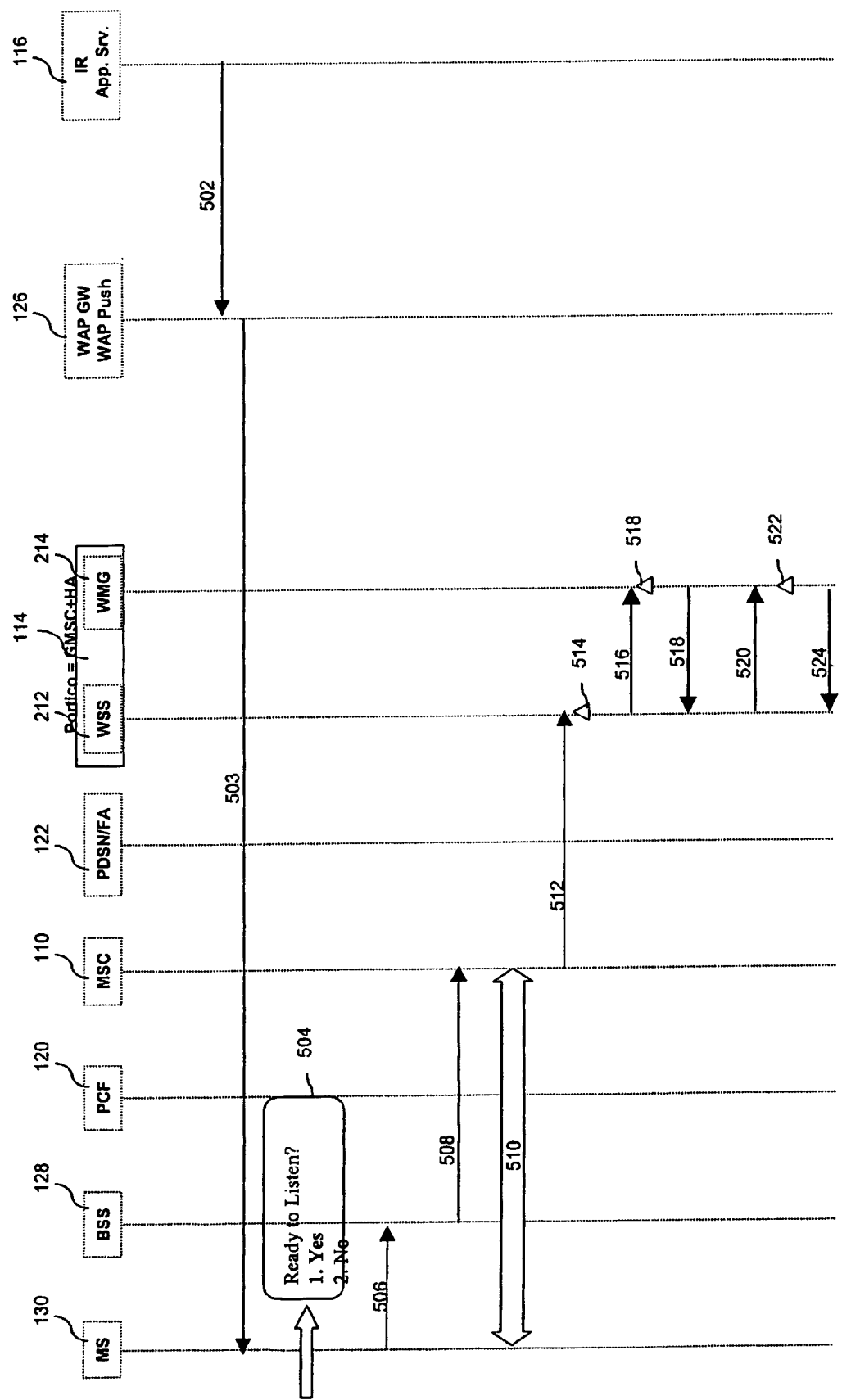

Now turning to FIG. 5, the IR Application Server 116 sends a menu 502 to the WAP GW 126 and then 503 to the MS 130 to select when the user is ready to listen. When the user chooses to listen from the menu 504, the selection is then sent 506 as an origination message to the BSS 128. In this embodiment, the selection of ready to listen is a WTA link with a dialing number and is sent to the BSS 128 from the MS 130. The BSS 128 then sends an CM Service Request[Service Option=Voice] message 508 to the MSC 110. A CDMA voice call setup 510 is then established between the MS 130 and MSC 110. The MSC 110 then sends an ISUP:IAM message 512 to the WSS 212. Now turning to the event numbered 514, the WSS 212 recognizes the incoming call to the WTA link as IR service. The WSS 212 associates the MIN with the MS IP address and informs the IR Application Server 116 to stream IR to the MS 130. A MEGACO:Modify message 516 is sent from the WSS 212 to the WMG 214. At this point 518, the WSS 212 commands the WMG 214 to disable packet data routing to the MS 130 while the user is on the voice call. The WMG 214 then sends a MEGACO:Success message 518 to the WSS 212. The WSS 212 then sends a MEGACO:Add message 520 to the WMG 214. The WMG 214 then establishes 522 a local (for the MSC 110) and a remote (for the IR Application Server 116) termination points for the voice connection. The WMG 214 then sends a MEGACO:Success message 524 back to the WSS 212.

Figure 6:
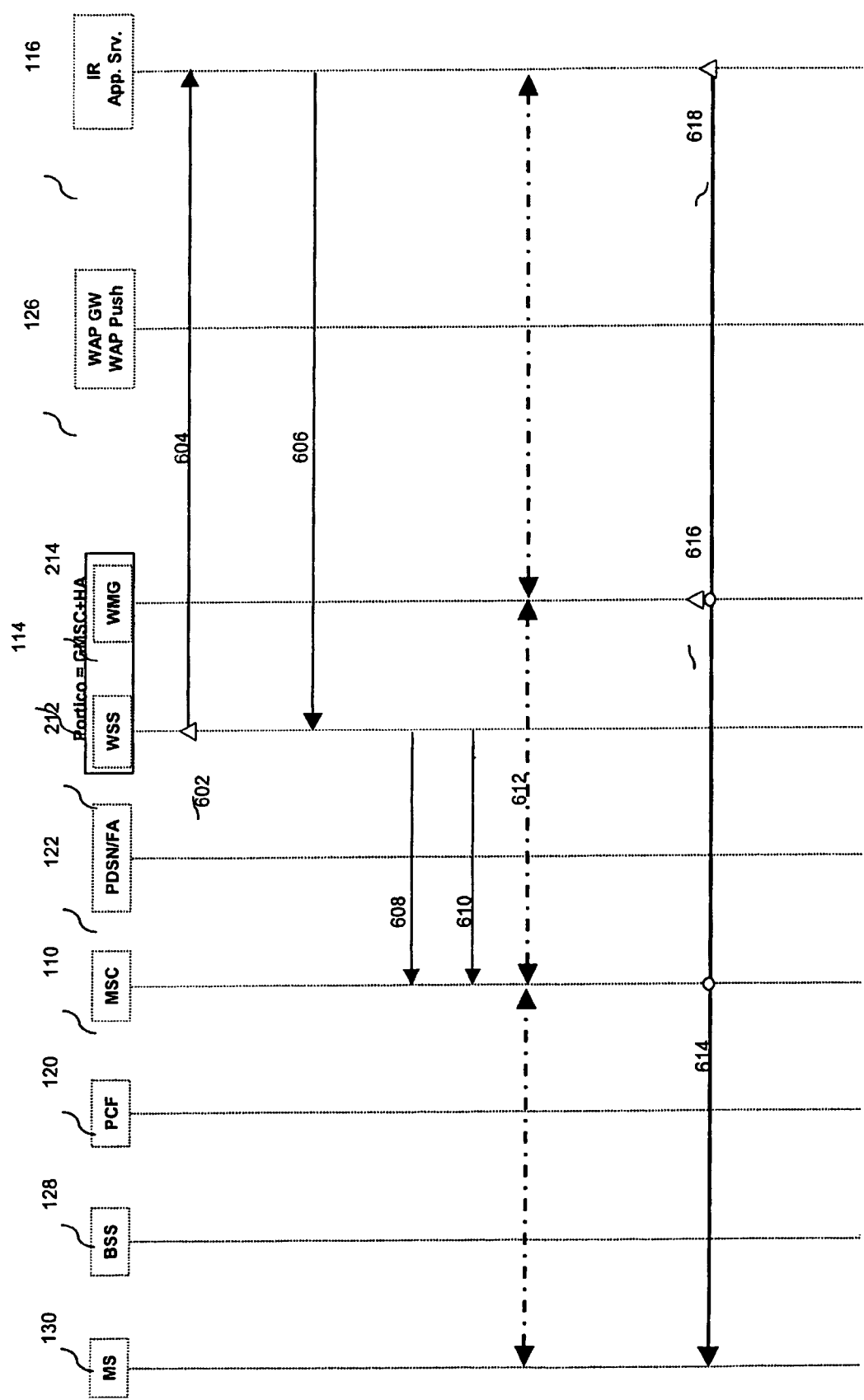

Now turning to FIG. 6, the WSS 212 establishes a far end connection with the IR Application Server 116 at event 602, by sending a HTTP request 604 to the IR Application Server 116. The IR Application Server 116 then sends a HTTP response 606 to the WSS 212. The WSS 212 then sends an ISUP:ACM (without alerting) message 608 to the MSC 110, as well as an ISUP:ANM message 610. A voice connection is then established 612 between the MS 130 and the IR Application Server 116. Audio is then sent from the IR Application Server 116 to the MS 130. Specifically, the IR Application Server 116 streams 618 the audio to the WMG 214 and then the WMG 214 buffers 616 the audio and then sends it to the MS 130.

Figure 7:
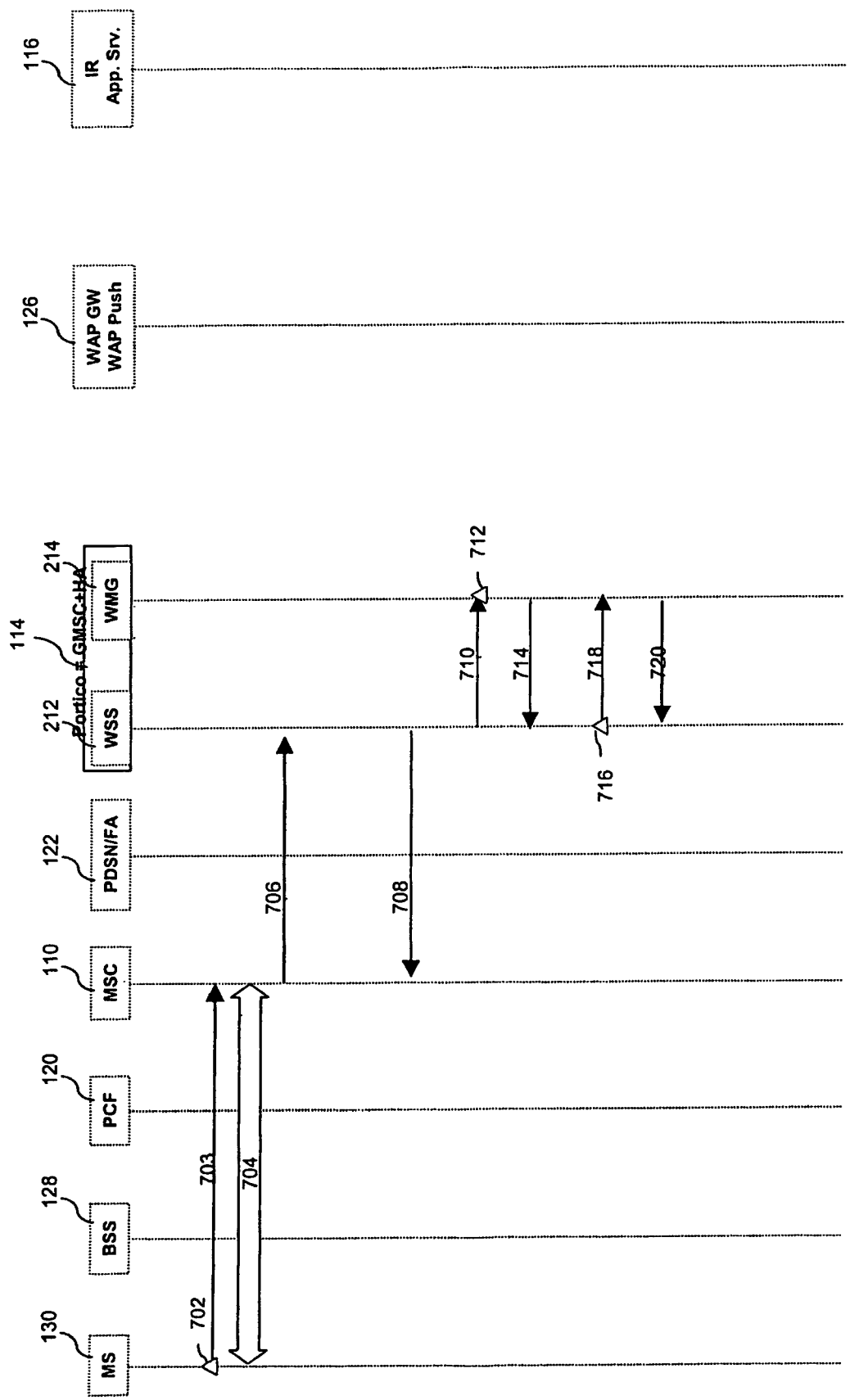

Now turning to FIG. 7, a call flow is shown that changes a radio station that the user is listening to. At stage 702, the MS 130 decides to switch radio stations and sends a message 703 to end the voice call session to the MSC 110. A voice call release 704 is then established between the MSC 110 and MS 130. The MSC 110 also sends an ISUP:Release message 706 to the WSS 212. In turn, the WSS 212 sends an ISUP:Release complete message 708 to the MSC 110. In addition, the WSS 212 sends a MEGACO:Subtract message 710 to the WMG 214 and commands 712 the WMG 214 to remove the context for the voice call termination points. The WMG 214 then sends a MEGACO:Success message 714 to the WSS 212. The WSS 212 then sends 716 a command to the WMG 214 to enable packet data routing to go through for the MS 130 while the MS 130 is not on a voice call. A MEGACO:Modify message 718 is sent the WMG 214. The WMG 214 then responds with a MEGACO:Success message 720.

Figure 8:
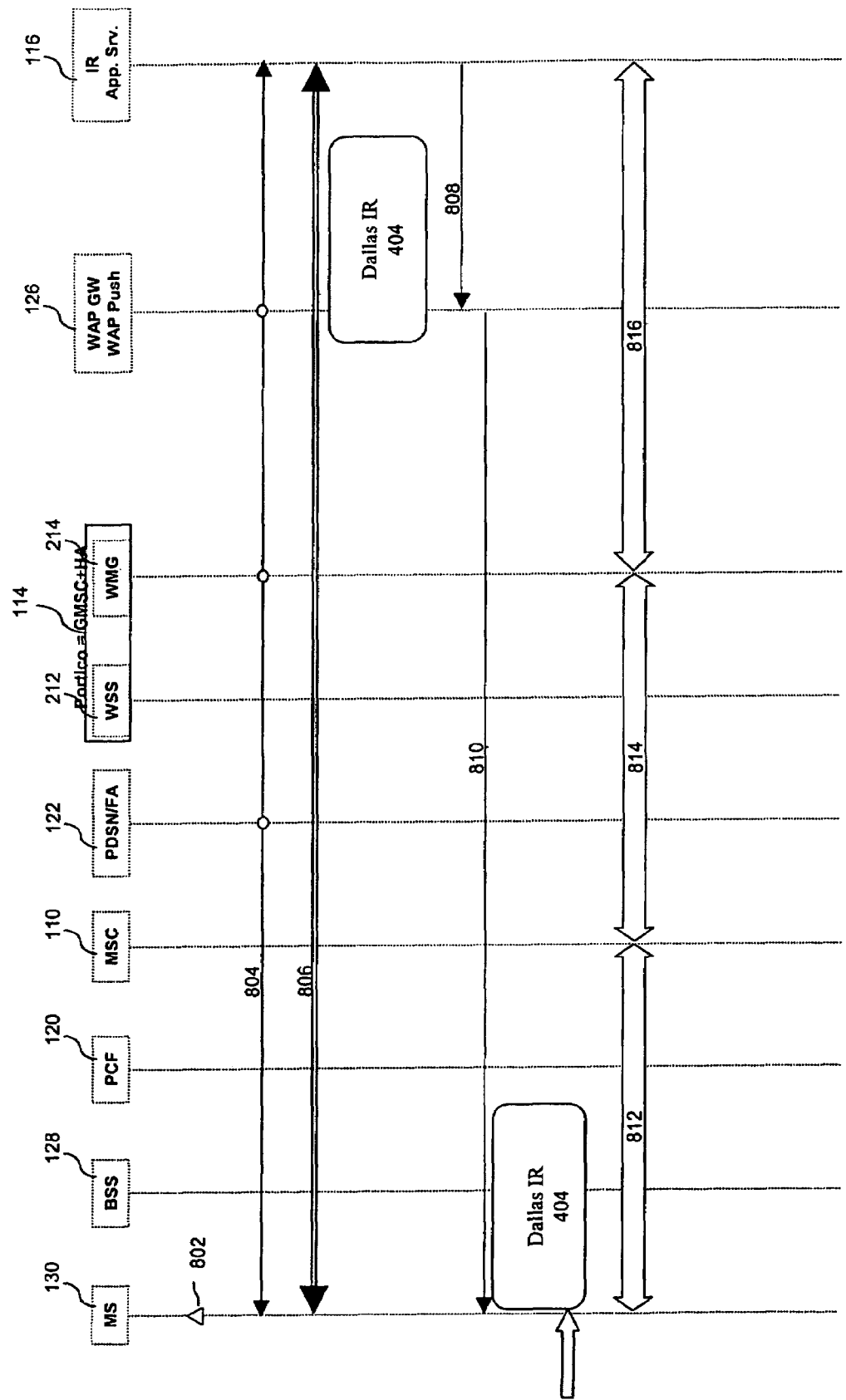

Now turning to FIG. 8, the MS 130 re-establishes 802 the WAP browser session 804 with the IR Application Server 116. The WAP Session is also established 806 between the MS 130 and the IR Application Server 116. The IR Application Server 116 then sends 808 a menu 404 with local stations to the WAP GW 126, which then sends 810 them 404 to the MS 130. The MS 130 then selects another radio station and a voice connection is then established as indicated by elements 812, 814 and 816.

Figure 9:
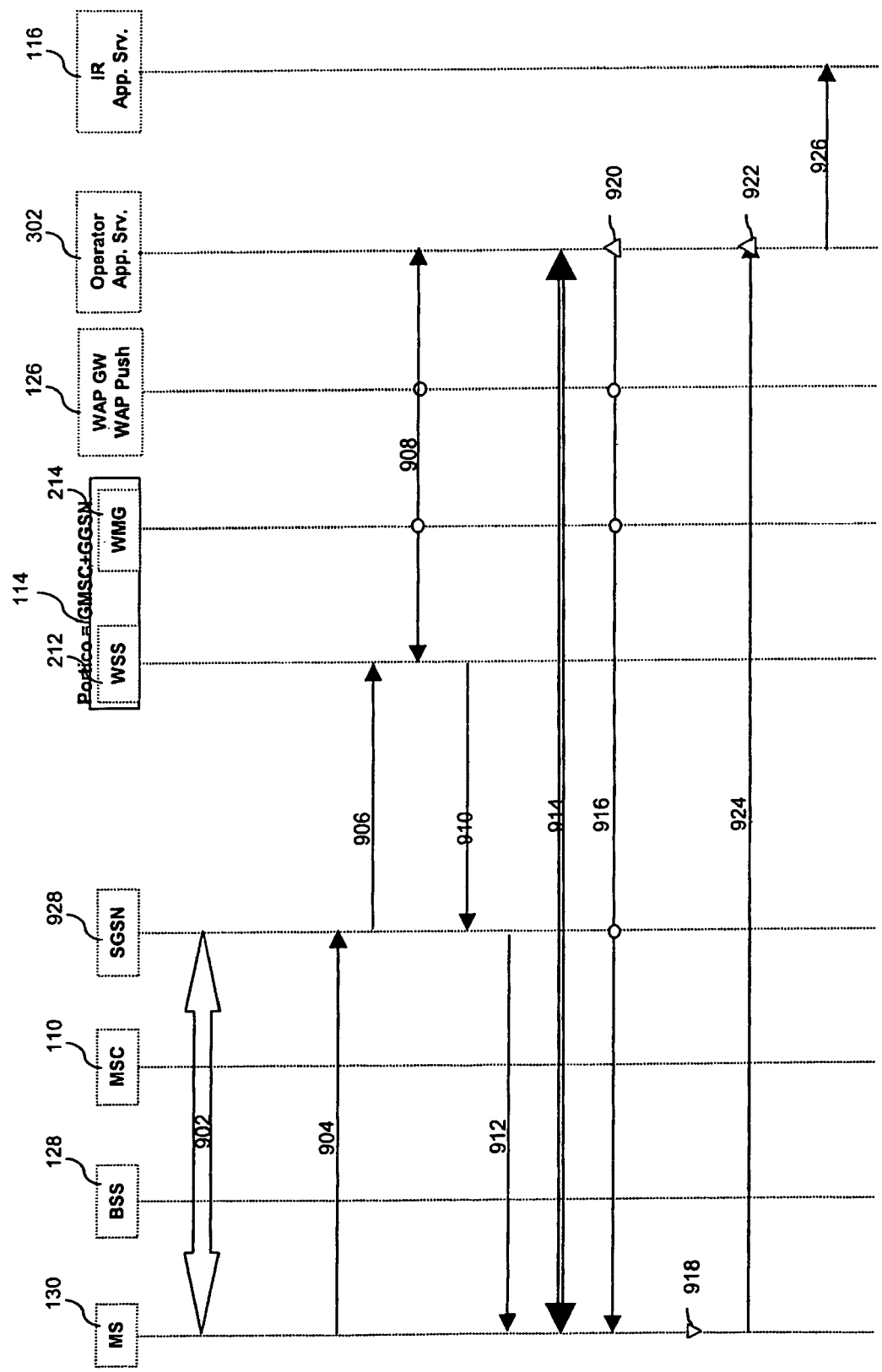
FIGS. 9-14 are GSM call flow diagrams for a second embodiment of the invention.

Now turning to FIG. 9, a call flow is shown that activates a session for the MS 130. The MS 130 first performs a combined GPRS and IMSI attach 902. Then the user launches a WAP browser session from the MS 130 by sending an Activate PDP Context_req 904 to the SGSN 928. The SGSN 928 then sends a Create PDP Context_Req 906 to WSS 212. A session is then established 908 between the WSS 212 and the Operator Application Server 302. In addition, the WSS 212 then sends a Create PDP Context_Resp 910 to SGSN 928. The SGSN 928 then sends an Activate PDP Context_Accept 912 to the MS 130. The MS 130 can then establish a WAP session with the Operator Application Server 302. A homepage is then downloaded 920 and sent 916 to the MS 130. The user then selects 918 IR Service from the homepage sends the selection 924 to the Operator Application Server 302. In this embodiment, the IR Service selection links to the IR Application Server 116 and thus sends a User Request URL: "IR Service" message 926 to the IR Application Server 116.

Figure 10:
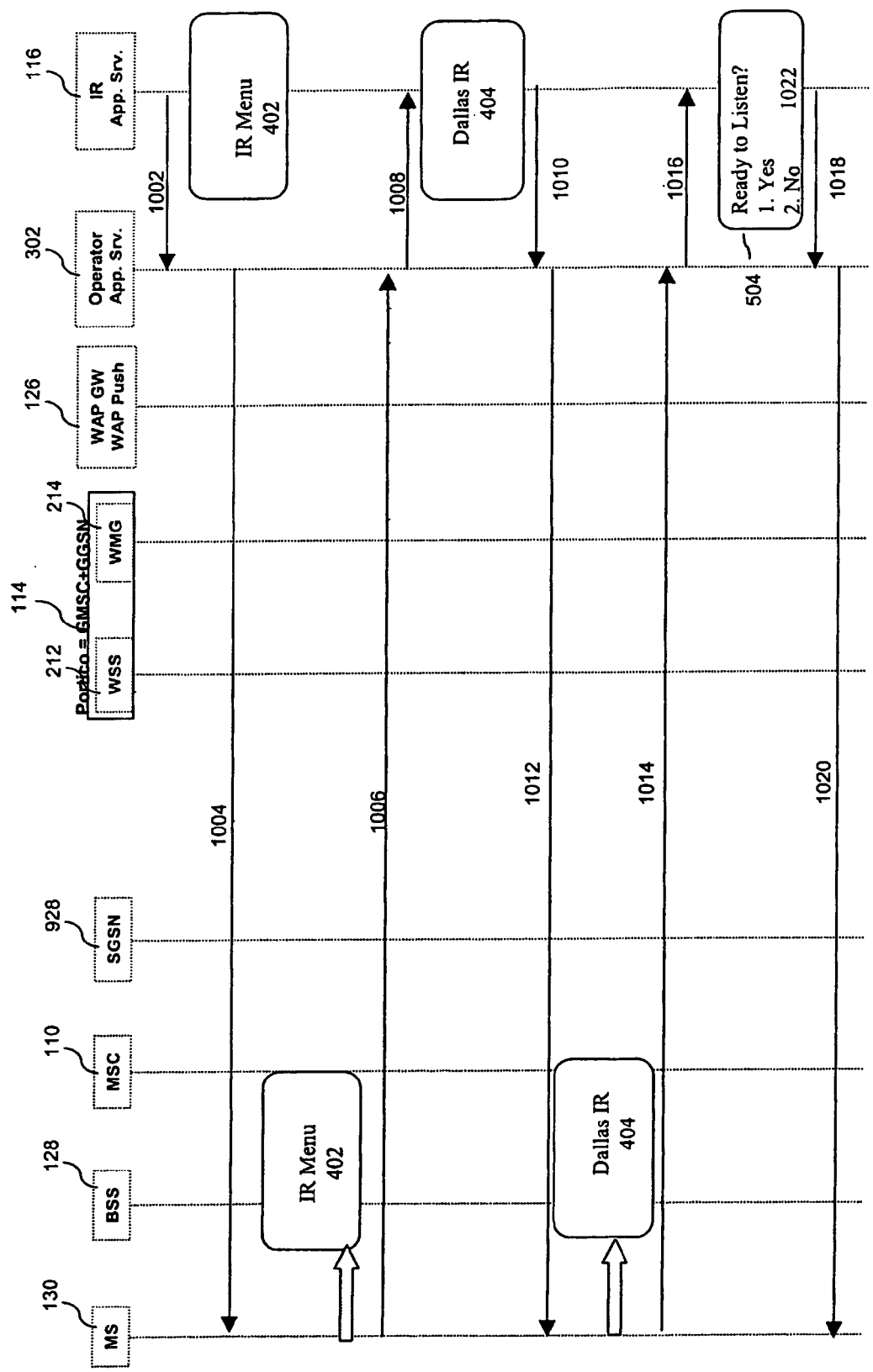

Now turning to FIG. 10, the service activation is continued. The IR Application Server 116 first sends 1002 IR Menu 402 to the Operator Application Server 302. The Operator Application Server 302 then sends 1004 the IR Menu 402 encoded to the MS 130. The user then selects from IR Menu 402 and sends the encoded selection 1006 to the Operator Application Server 302. The selection is then also sent 1008 to the IR Application Server 116. The IR Application Server 116 then sends 1010 a Dallas Menu 404 to the Operator Application Server 302 with local selections to choose from. The Operator Application Server 302 then sends 1012 the Dallas Menu 404 to the MS 130. The user then selects from the Dallas Menu 404 and sends 1014 the encoded selection to the Operator Application Server 302. The Operator Application Server 302 then sends 1016 the selection to the IR Application Server 116. A Ready to listen menu 1022 is then sent 1018 to the Operator Application Server 302 which then sends 1020 the menu 1022 to the MS 130.

Figure 11:
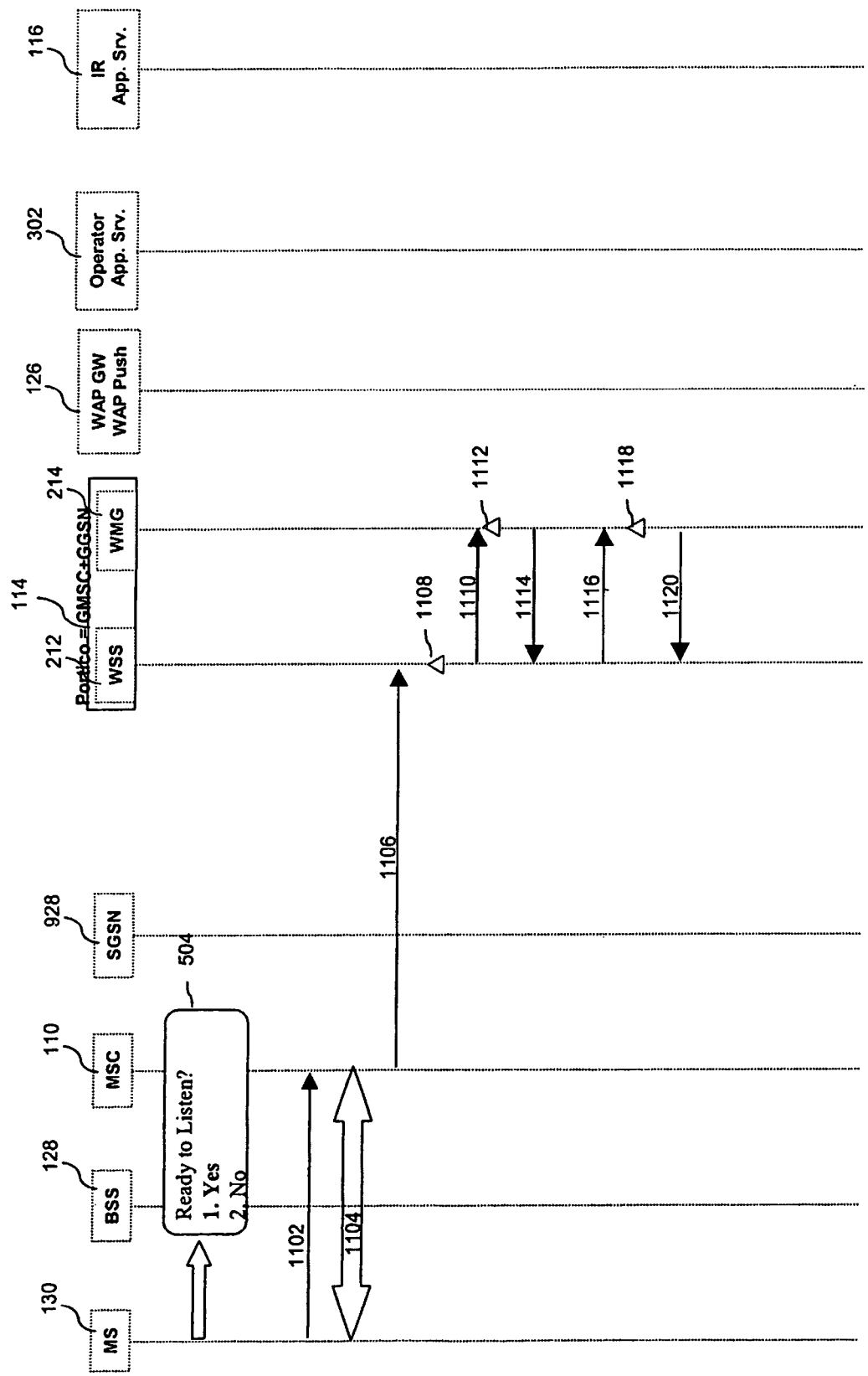

Now turning to FIG. 11, the service activation is continued. The Ready to listen menu 504 in this embodiment actually includes a WTA link that dials number "#333" to activate the IR service when the user selects ready to listen. If the user selects not ready to listen, the previous menu is then sent to the user. When the user selects ready to listen, a CM_Service_Request[MO Call] 1102 is sent to the MSC 110 and a GSM Voice Call is then setup 1104. An ISUP:IAM message 1106 is then sent to the WSS 212. At this point 1108, the WSS 212 recognizes incoming call to #333 as IR Service. The WSS 212 associates the MIN with the MS IP address and informs the IR Application Server 116 to stream IR to the MS 130. The WSS 212 sends a MEGACO:Modify message 1110 to the WMG 214 and commands the WMG 214 to disable packet data routing to the MS 130 while on the voice call. The WMG 214 then sends a MEGACO:Success message 1114 to the WSS 212. In turn, the WSS 212 then sends a MEGACO:Add message 1116 to the WMG 214. The WMG 214 then establishes 1118 a local (for the MSC 110) and a remote (for the IR Application Server 116) termination point for voice communication. The WMG 214 then sends a MEGACO:Success message 1120 to the WSS 212.

Figure 12:
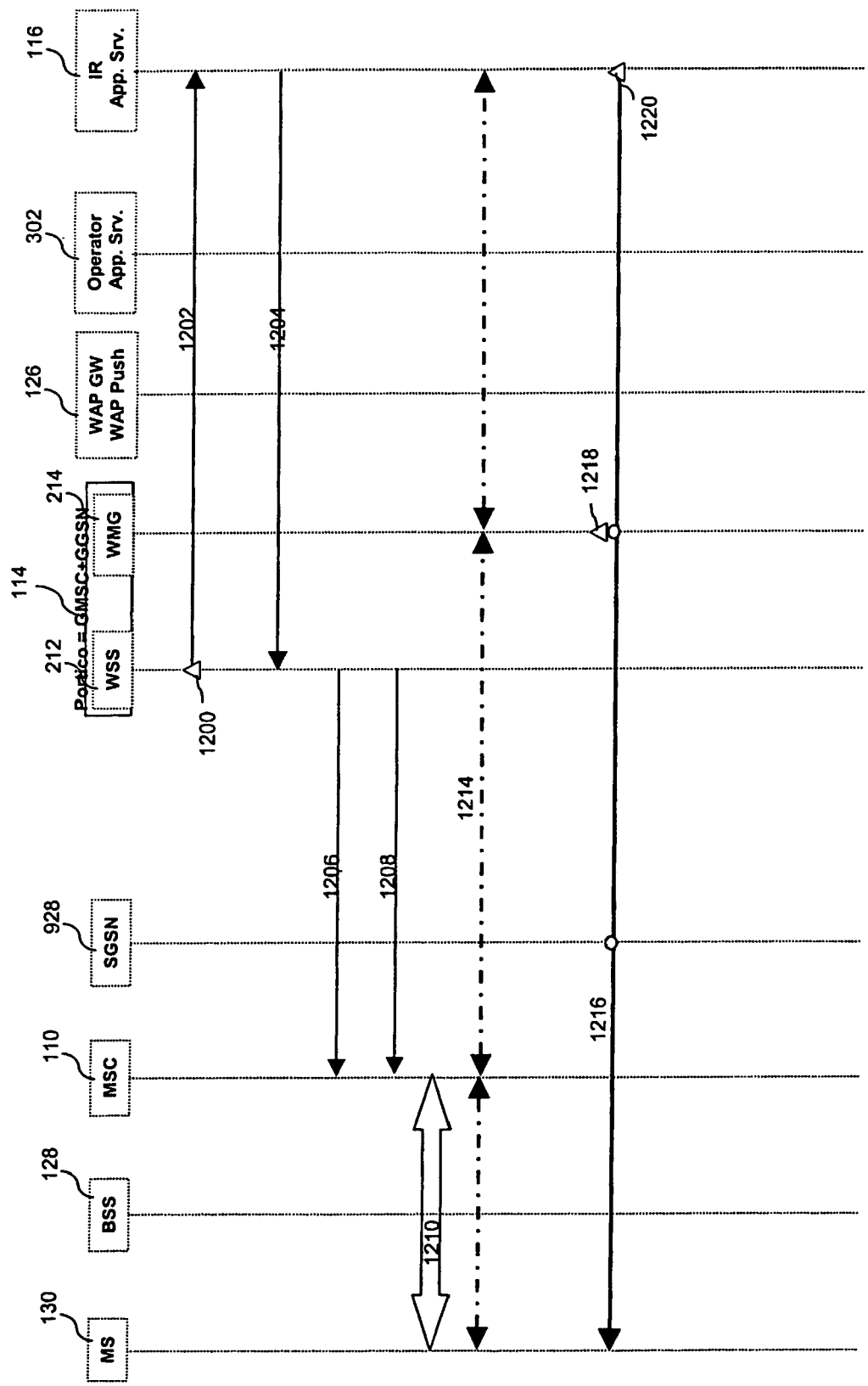

Now turning to FIG. 12, the service activation is continued. The WSS 212 establishes 1200 a far end connection with the IR Application Server 116 for providing the streaming audio (or canned) by sending a HTTP Request 1202 to the IR Application Server 116. A HTTP Response 1204 is then sent back to the WSS 212 from the IR Application Server 116. The WSS 212 then sends a ISUP:ACM (without alerting) message 1206 as well as an ISUP:ANM message 1208 to the MSC 110. The GSM Voice call setup 1210 is then finished between the MS 130 and the MSC 110, and an Audio Path is Established 1214. The audio is then played 1216 at the MS 130 by the IR Application Server 116 streaming the audio 1220 to the WSS 212, where it is buffered 1218, and then sent to the MS 130.

Figure 13:
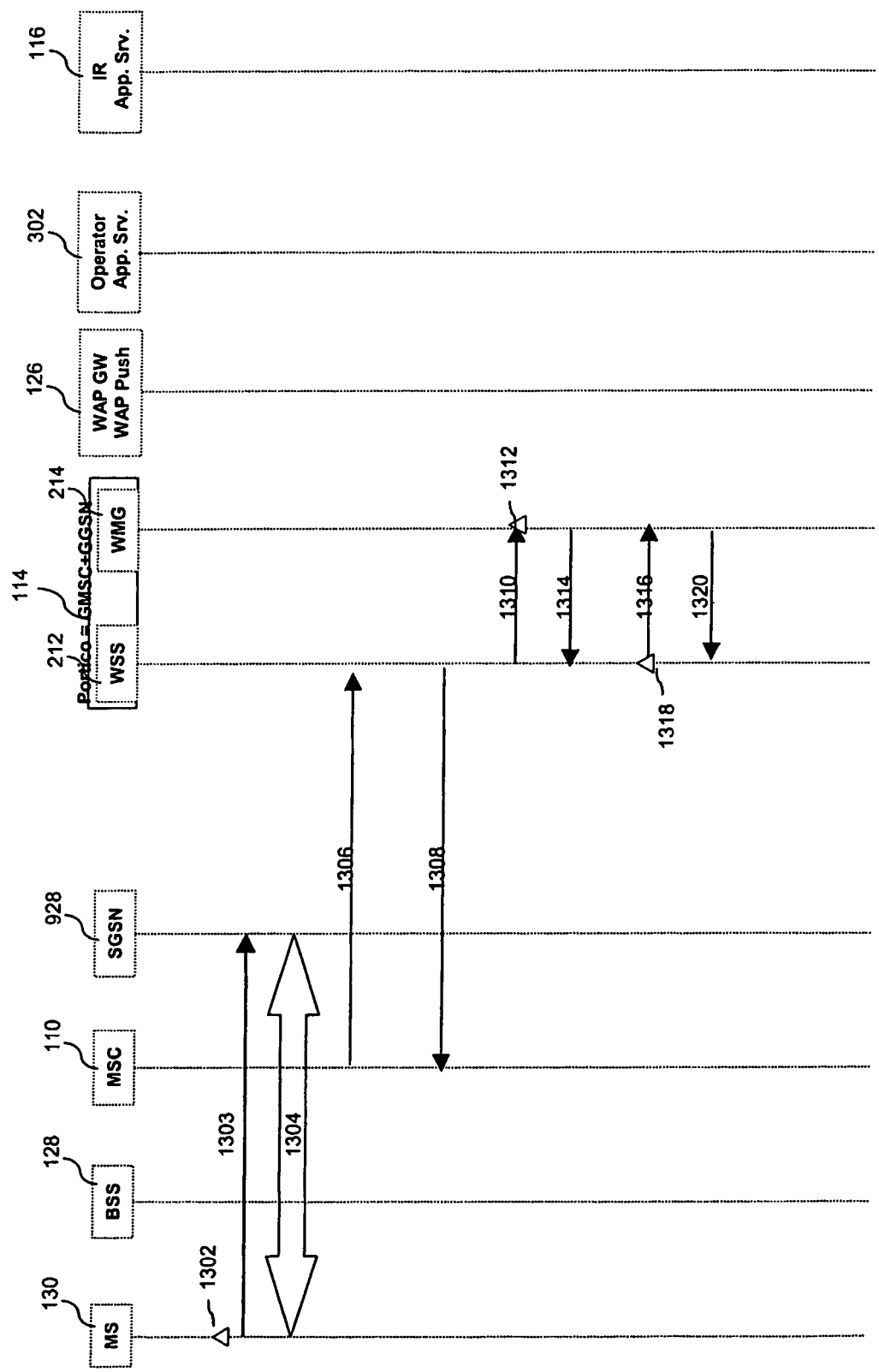

Now turning to FIG. 13, a scenario is described where the user decides to switch audio channels. At this point 1302, the MS 130 decides to switch to a different channel and triggers the end of the voice session 1303. The voice call is then released 1304 between the MS 130 and the SGSN 928. An ISUP:Release message 1306 is sent from the MSC 110 to the WSS 212. The WSS 212 then sends an ISUP:Release Complete message 1308 to the MSC 110. The WSS 212 then sends a MEGACO:Subtract message 1310 to the WMG 214 and commands the W124 to remove the context for the voice call termination points. The WMG 214 then sends a MEGACO:Success message 1314 to the WSS 212. The WSS 212 then sends a command 1318 to the WMG 214 to enable packet data routing to go through for the MSC 110 while the user is not on a Voice call. Creating a new context is not required at this point given that a tunnel is established at the WMG 214 for the MS 130. The WSS 212 sends a MEGACO:Modify message 1316 to the WMG 214 and in turn, the WMG 214 sends a MEGACO:Success message 1320 back to the WSS 212.

Figure 14:
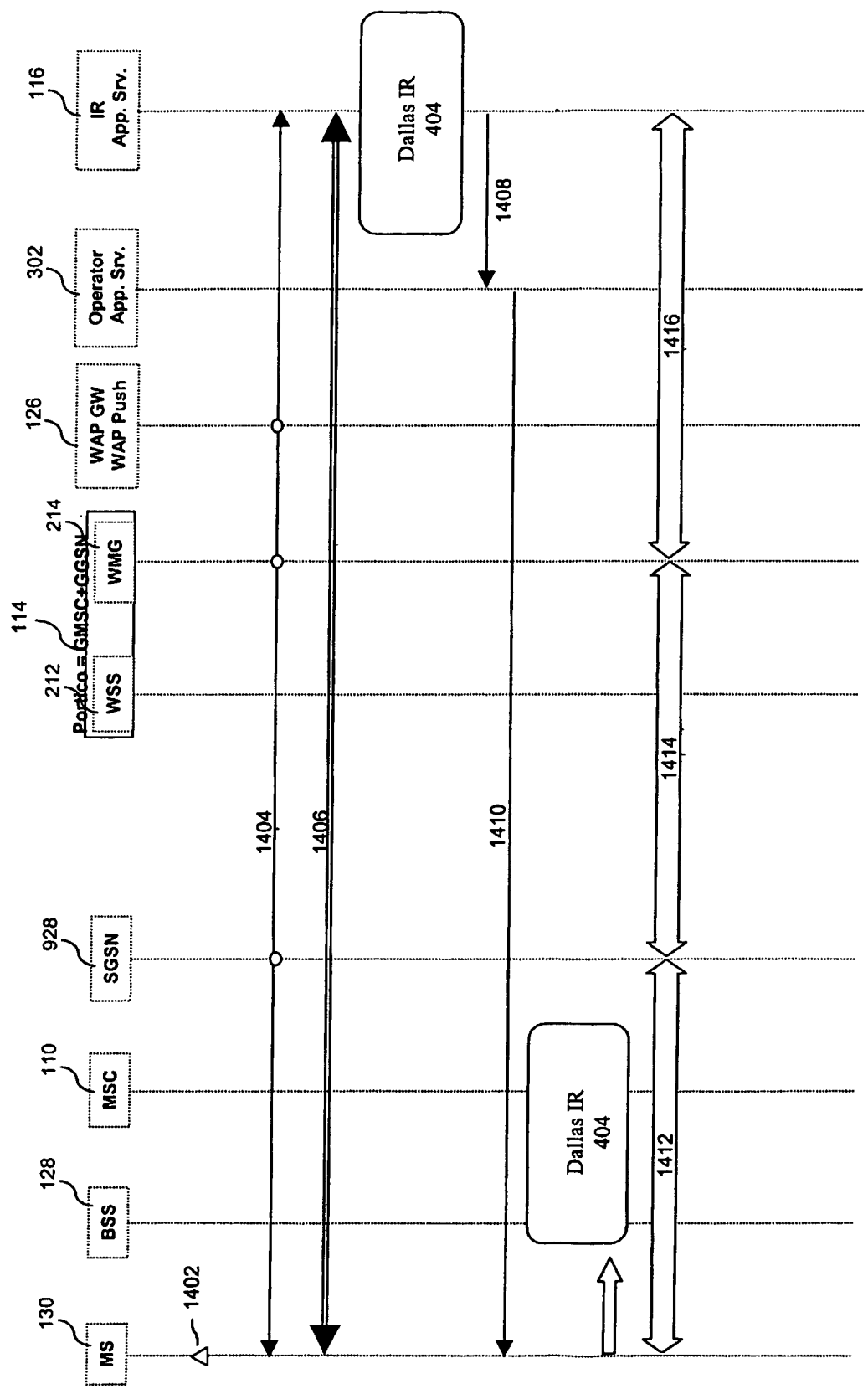

Now turning to FIG. 14, the scenario of changing audio channels is continued. At this point 1402, the MS 130 re-establishes the WAP browser Session 1404 to the IR Application Server 116, and thus the WAP session is established 1406. The IR Application Server 116 then sends the Dallas IR menu 404 back 1408 to the Operator Application Server 302, which in turn, sends 1410 the Dallas local menu 404 to the MS 130. The MS 130 then selects a local station and then the voice call is established again as indicated 1412, 1414, and 1416.

While the invention has been particularly shown and described with reference to the preferred embodiment thereof, it will be understood by those skilled in the art that various changes in form and detail may be made therein without departing from the spirit and scope of the invention, as set forth in the following claims.

a Private Data Service Node (PDSN);

a mobile station (MS) initiating a request to establish a Point to Point (PPP) session from the MS to the PDSN;

an Internet Audio Gateway, wherein the PDSN establishes a connection to a Internet Audio Gateway;

a Wireless Access Protocol (WAP) Gateway, wherein a Wireless Access Protocol (WAP) Browser session is established between the MS and the WAP gateway and a WAP session is established between the MS and the WAP gateway; and a plurality of Internet Audio contents to play on the MS, wherein the user selects from the plurality of Internet Audio contents and the selection is streamed to the Internet Audio Gateway, wherein the Internet Audio Gateway buffers the stream of audio content and a portion of the audio content is sent from the Internet Audio Gateway to the MS.

What is claimed is:

1. A method for providing Internet based audio to a user in a wireless network, the method comprising:

initiating a request to establish a Point to Point (PPP) session from a mobile station (MS) to a Packet Data Service Node (PDSN);

upon establishing the PPP session, establishing a connection from the PDSN to an Internet Audio Gateway to register the MS with the Internet Audio Gateway, the Internet Audio Gateway having access to a plurality of Internet Audio contents stored on an Internet Radio (IR) Application Server;

establishing a Wireless Application Protocol (WAP) session between the MS and a WAP gateway coupled to the IR Application Server to provide the plurality of Internet Audio contents to the MS to select from;

selecting from the plurality of Internet Audio contents to play on the MS via the WAP gateway;

providing an indication of the selection of the plurality of Internet Audio contents made by the MS to the IR Application Server;

receiving a call from the MS at the Internet Audio Gateway, the call including a mobile identity identifying the MS within a network;

using the mobile identity to retrieve the selection of the plurality of Internet Audio contents from the IR Application Server; and sending the selection of the plurality of Internet Audio contents to the MS.

2. The method of claim 1 wherein the selecting from a plurality of Internet Audio contents includes selecting from a set of cities.

3. The method of claim 1 wherein the selecting from a plurality of Internet Audio contents includes selecting from a set of audio contents that are within a geographic region.

4. The method of claim 1 wherein the selecting from a plurality of Internet Audio contents includes selecting from a plurality of radio stations.

5. The method of claim 1 further including changing the selection of the plurality of Internet Audio contents.

6. The method of claim 1 wherein the MS utilizes a Global Service Messaging wireless standard for wireless communication.

7. The method of claim 1 wherein the MS utilizes a Code Division Multiplexing Access protocol for wireless communication.

8. The method of claim 1 wherein the audio content is streamed to the Internet Audio gateway and buffered and then sent to the MS.

9. A wireless communications network for providing Internet based audio to a user in the wireless communications network, the network comprising:

a Packet Data Service Node (PDSN);

a mobile station (MS) initiating a request to establish a Point to Point (PPP) session from the MS to the PDSN;

an Internet Audio Gateway having access to a plurality of Internet Audio contents stored on an Internet Radio (IR) Application Server, wherein, upon establishing the PPP session, the PDSN establishes a connection to the Internet Audio Gateway to register the MS with the Internet Audio Gateway; and a Wireless Application Protocol (WAP) Gateway coupled to the IR Application Server, wherein a Wireless Application Protocol (WAP) Browser session is established between the MS and the WAP gateway to provide the plurality of Internet Audio contents to the MS to select from;

wherein the user selects from the plurality of Internet Audio contents via the WAP gateway;

wherein an indication of the selection of the plurality of Internet Audio contents made by the MS is provided to the FR Application Server;

wherein the MS initiates a call to the Internet Audio Gateway, the call including a mobile identity identifying the MS within a network, the Internet Audio Gateway uses the mobile identity to retrieve the selection of the plurality of Internet Audio contents from the IR Application Server, and the selection is streamed to the Internet Audio Gateway, wherein the Internet Audio Gateway buffers the stream of audio content and a portion of the audio content is sent from the Internet Audio Gateway to the MS.

10. The network of claim 9 wherein the plurality of Internet Audio contents includes a set of cities.

11. The network of claim 9 wherein the plurality of Internet Audio contents includes a set of audio contents that are within a geographic region.

12. The network of claim 9 further including an ability to change the selection of the plurality of Internet Audio contents.

13. The network of claim 9 wherein the MS utilizes a Global Service Messaging wireless standard for wireless communication.

14. The network of claim 9 wherein the MS utilizes a Code Division Multiplexing Access protocol for wireless communication.

15. The network of claim 9 wherein the audio content is streamed from the Internet Audio gateway to the MS.

16. A method for providing Internet based audio to a user in a wireless network, the method comprising:

initiating a request to establish a Point to Point (PPP) session from a mobile station (MS) to a Packet Data Service Node (PDSN);

upon establishing the PPP session, establishing a connection from the PDSN to a Internet Audio Gateway to register the MS with the Internet Audio Gateway, the Internet Audio Gateway having access to a plurality of Internet Audio contents stored on an Internet Radio (IR) Application Server;

establishing a Wireless Application Protocol (WAP) Browser session between the MS and a WAP gateway coupled to the IR Application Server to provide the plurality of Internet Audio contents to the MS to select from;

selecting from the plurality of Internet Audio contents to play on the MS via the WAP gateway;

providing an indication of the selection of the plurality of Internet Audio contents made by the MS to the IR Application Server;

receiving a call from the MS at the Internet Audio Gateway, the call including a mobile identity identifying the MS within a network;

using the mobile identity to retrieve the selection of the plurality of Internet Audio contents from the IR Application Server;

streaming the selection of the plurality of Internet Audio contents to the Internet Audio Gateway;

buffering a stream of audio content at the Internet Audio Gateway; and sending a portion of the audio content from the Internet Audio Gateway to the MS.

17. The method of claim 16 wherein the selecting from a plurality of Internet Audio contents includes selecting from a set of cities.

18. The method of claim 16 wherein the selecting from a plurality of Internet Audio contents includes selecting from a set of audio contents that are within a geographic region.

19. The method of claim 16 wherein the selecting from a plurality of Internet Audio contents includes selecting from a plurality of radio stations.

20. The method of claim 16 further including changing the selection of the plurality of Internet Audio contents.

* * * * *

UNITED STATES PATENT AND TRADEMARK OFFICE
CERTIFICATE OF CORRECTION

PATENT NO.       : 7,616,648 B2                                             Page 1 of 1
APPLICATION NO.  : 10/510436
DATED            : November 10, 2009
INVENTOR(S)      : Silver et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this

Nineteenth Day of October, 2010

David J. Kappos
*Director of the United States Patent and Trademark Office*